(12) United States Patent
Desjoyeaux et al.

(10) Patent No.: US 10,415,472 B2
(45) Date of Patent: Sep. 17, 2019

(54) DEVICE FOR ATTACHING AN AIR INLET ONTO A FAN CASING OF AN AIRCRAFT TURBOJET NACELLE

(71) Applicant: SAFRAN NACELLES, Gonfreville l'Orcher (FR)

(72) Inventors: Bertrand Desjoyeaux, Sainte Adresse (FR); Simon Verger, Saint Romain de Colbosc (FR); Sylvain Sentis, Le Havre (FR)

(73) Assignee: SAFRAN NACELLES, Gonfreville l'Orcher (FR)

( * ) Notice: Subject to any disclaimer, the term of this patent is extended or adjusted under 35 U.S.C. 154(b) by 266 days.

(21) Appl. No.: 15/459,014

(22) Filed: Mar. 15, 2017

(65) Prior Publication Data

US 2017/0184023 A1 Jun. 29, 2017

Related U.S. Application Data

(63) Continuation of application No. PCT/FR2015/052495, filed on Sep. 17, 2015.

(30) Foreign Application Priority Data

Sep. 18, 2014 (FR) ...................................... 14 58829

(51) Int. Cl.
*F02C 7/045* (2006.01)
*B64D 29/06* (2006.01)
(Continued)

(52) U.S. Cl.
CPC .............. *F02C 7/045* (2013.01); *B64D 27/16* (2013.01); *B64D 29/06* (2013.01); *B64D 33/02* (2013.01);
(Continued)

(58) Field of Classification Search
CPC .... B64D 2033/0206; B64D 2033/0286; B64D 33/02; B64D 29/06; B64D 2033/20;
(Continued)

(56) References Cited

U.S. PATENT DOCUMENTS 6,123,170 A * 9/2000 Porte ...................... B64D 33/02
181/198
6,857,669 B2 * 2/2005 Porte ...................... B64D 29/00
285/368
(Continued)

FOREIGN PATENT DOCUMENTS

FR 2767560 2/1999
FR 2869360 10/2005
(Continued)

OTHER PUBLICATIONS

International Search Report for International Application PCT/FR2015/052495, dated Dec. 23, 2015.

*Primary Examiner* — Hai H Huynh
*Assistant Examiner* — Gonzalo Laguarda
(74) *Attorney, Agent, or Firm* — Burris Law, PLLC

(57) ABSTRACT

A device for fastening a downstream end of an air inlet on a fan casing of an aircraft turbojet engine nacelle is provided. The device includes an acoustic shroud, a first flange coupled to the fan casing, a second L-shaped flange having a base coupled to the acoustic shroud, and a collar linked to the first flange. The acoustic shroud extends from an upstream segment to a downstream segment which defines an inner skin and an outer skin that encloses an acoustic panel. The collar further includes a protrusion that extends from the outer skin to the downstream segment.

11 Claims, 2 Drawing Sheets

(51) Int. Cl.
*F01D 25/24* (2006.01)
*F02K 1/82* (2006.01)
*B64D 27/16* (2006.01)
*B64D 33/02* (2006.01)
*F02K 3/06* (2006.01)

(52) U.S. Cl.
CPC ............ *F01D 25/243* (2013.01); *F02K 1/827* (2013.01); *F02K 3/06* (2013.01); *B64D 2033/0206* (2013.01); *B64D 2033/0286* (2013.01); *F05D 2220/323* (2013.01); *F05D 2230/53* (2013.01); *F05D 2250/75* (2013.01); *F05D 2260/30* (2013.01); *F05D 2260/31* (2013.01); *F05D 2260/96* (2013.01); *F05D 2300/121* (2013.01); *F05D 2300/133* (2013.01); *F05D 2300/603* (2013.01); *Y02T 50/672* (2013.01)

(58) Field of Classification Search
CPC ...... F02C 7/045; Y02T 50/672; F01D 25/243; F02K 1/827; F02K 3/06; F05D 2260/31; F05D 2260/96; F05D 2260/30

USPC .............................................. 415/213.1, 200
See application file for complete search history.

(56) References Cited

U.S. PATENT DOCUMENTS

| | | | | |
|---|---|---|---|---|
| 8,646,723 B2* | 2/2014 | Porte | ...................... | B64D 29/06 181/214 |
| 8,650,853 B2* | 2/2014 | Porte | ...................... | B64D 33/02 181/214 |
| 8,851,416 B2* | 10/2014 | Porte | ...................... | B64D 33/02 244/53 B |
| 2013/0336773 A1* | 12/2013 | Robertson | ............... | F01D 25/24 415/200 |
| 2015/0007896 A1* | 1/2015 | Joret | ...................... | F02C 7/045 137/15.1 |

FOREIGN PATENT DOCUMENTS

| | | |
|---|---|---|
| FR | 2959726 | 11/2011 |
| FR | 2988778 | 10/2013 |
| WO | 2012/175850 | 12/2012 |

* cited by examiner

DEVICE FOR ATTACHING AN AIR INLET ONTO A FAN CASING OF AN AIRCRAFT TURBOJET NACELLE

CROSS-REFERENCE TO RELATED APPLICATIONS

This application is a continuation of International Application No. PCT/FR2015/052495, filed on Sep. 17, 2015, which claims the benefit of FR 14/58829 filed on Sep. 18, 2014. The disclosures of the above applications are incorporated herein by reference.

FIELD

The present disclosure relates to an air inlet of an aircraft turbojet engine nacelle.

BACKGROUND

The statements in this section merely provide background information related to the present disclosure and may not constitute prior art.

An aircraft is driven by several turbojet engines each housed in a nacelle accommodating an assembly of additional actuating devices relating to its operation and ensuring various functions when the turbojet engine is in operation or stopped.

A turbojet engine nacelle generally has a substantially tubular structure which extends along a longitudinal axis from upstream to downstream along the flow direction of the air flow.

The nacelle comprises an air inlet upstream of the turbojet engine, a median section intended to surround a fan of the turbojet engine, a downstream section surrounding the combustion chamber of the turbojet engine, intended to channel the secondary air flow and optionally integrating thrust reversal means, and is generally ended by an ejection nozzle whose outlet is located downstream of the turbojet engine.

The air inlet comprises in particular an annular inlet lip forming a leading edge which is adapted to allow the optimal collection of the air necessary for supplying the fan and the inner compressors of the turbojet engine. Downstream of the lip, an acoustic downstream structure properly channels the air towards the blades of the fan.

This downstream structure of the air inlet comprises in particular an annular conduit whose structure is particularly adapted to attenuate the noise emitted by the turbojet engine also called an acoustic air inlet shroud.

For this, the shroud is mainly constituted by an acoustic sandwich structure comprising, an acoustically permeable skin also forming the inner skin of the air conduit, a sealed outer skin, and an alveolar core of predefined height linking the two skins, this core being generally of the honeycomb type, the assembly constituting an sound damper.

The shroud is assembled in its downstream portion with the fan casing along a flanging plane by means of a device including fasteners linking the flanges of the air inlet shroud and of the casing opposite to each other.

For safety reasons, in case of loss of a blade of the fan, the flanging plane must be positioned upstream of the blade of the plane of the fan.

In addition, it is desirable to attenuate the noises emitted by the engine upstream and downstream of the flanging plane and to maximize the acoustically efficient inner surface of the flow path, and in particular the acoustic surface of the air inlet shroud.

For this purpose, the document FR-A-2767560 describes and represents a device including a first L-shaped flange secured to the fan casing and a second L-shaped flange whose axial base is riveted on the outer skin of the shroud and whose radial collar is fastened to the first flange.

This type of device has in particular the disadvantage of having to link the inner skin and the outer skin of the shroud in order to associate them in one single skin with the fastening area of the second L-shaped flange.

In addition, the interlocking of an upstream portion of the casing in the shroud may be delicate to carry out and may cause a vibratory instability of the upstream portion of the casing which is overhanging. It also increases the risks of end damage of the parts during the interlocking.

Document FR-A-2869360 which proposes a second add-on L-shaped flange fastened to the outer skin of the shroud is also known. This type of device has the disadvantage of perforating the outer skin. The quality of laying the fasteners is difficult to check and the acoustic cavity between outer skin and inner skin is degraded reducing the efficiency of the area. This document also proposes an L-shaped flange directly bonded or made on the back of the outer skin of the shroud, however this device presents the issue of punching the alveolar material linking the inner skin and the outer skin during the mechanical deformations induced by the operation of the turbojet engine.

A device described and shown in the document FR-A-2959726 which includes a first flange which is secured to the casing and a second flange which is secured to the shroud is also known.

This device provides advantages by proposing an L-shaped flange linked to the shroud and which is shifted to the back of the outer skin of the shroud which avoids impacting the acoustic treatment of said shroud, but is difficult and expensive to carry out.

SUMMARY

The present disclosure provides a device for fastening a downstream end of an air inlet on a fan casing of an aircraft turbojet engine nacelle, the air inlet including an acoustic shroud having an annular shape which extends axially from upstream to downstream along a longitudinal axis and which is delimited radially by an inner skin and an outer skin enclosing an acoustic panel, the device including a first flange which is secured to the casing, and a second L-shaped flange which comprises a base provided to be linked to the shroud, and a collar provided to be linked to the second flange, characterized in that it includes a protrusion which extends longitudinally from an upstream segment secured to the outer skin of the shroud, to a flared downstream segment which delimits a radial space with the shroud and which is adapted to be fastened on the base of the second L-shaped flange by fastening means without degrading the outer skin of the shroud.

The device according to the present disclosure has a simple design and may provide a reliable and inexpensive solution for fastening a shroud on a fan casing.

In addition, the present disclosure may improve preserving the integrity of the acoustic structure of the shroud formed by the outer skin, the inner skin and the acoustic panel of the shroud.

In one form, the protrusion has the shape of an annular ring which extends about the axis of the shroud.

In addition, the acoustic panel of the shroud extends longitudinally continuously from upstream to downstream at least until the downstream segment of the protrusion.

The ring and the second flange may each be made of a distinct material which is selected to respond to the mechanical stresses and the imposed weight requirements.

In one form, the second flange is made of metallic material.

This type of material offers an elastic strength greater than the elastic strength of a composite material, thus absorbing increased forces with a reduced risk of breaking.

According to one form, the second flange is made of a plurality of independent portions which are arranged in an annular shape about the axis of the shroud.

In addition, the ring is made of a composite material.

This type of material offers a weight/resistance compromise adapted to the mechanical stresses subjected to the ring.

Advantageously, the ring has a wave shape which draws an alternation of hollows and bumps distributed about the axis of the shroud, said bumps each forming a radial overthickness designed to promote the fastening of the second L-shaped flange.

Also, the acoustic panel extends longitudinally downstream beyond the plane of the second L-shaped flange.

The design of the device according to one form of the present disclosure allows not perforating the acoustic panel by fastening means, thus preserving the acoustic absorption performance of the panel.

In addition, the device includes a corner which is interposed radially between the outer skin of the shroud and the flared downstream segment of the ring.

According to another form, the fastening means includes a plurality of metal links which connect the flared downstream segment of the ring on the base of the second L-shaped flange.

The present disclosure also concerns a method for manufacturing a device for fastening a downstream end of an air inlet on a fan casing of an aircraft turbojet engine nacelle, characterized in that the protrusion is made integral with the outer skin of the shroud.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
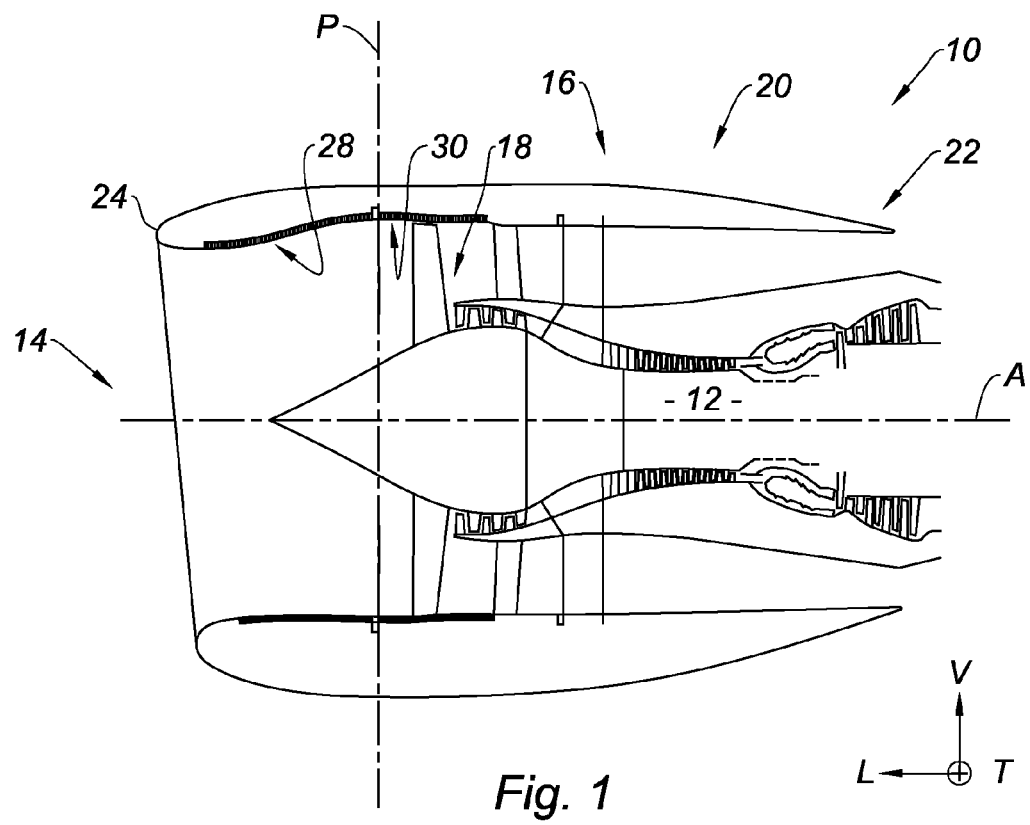
FIG. 1 is a schematic view in longitudinal section, which illustrates an aircraft turbojet engine nacelle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In order to clarify the description and the claims, there will be adopted in a non limiting way, the terminology longitudinal, vertical and transverse with reference to the trihedron L, V, T indicated in the Figures, whose axis L is parallel to the axis A of the nacelle.

Figure 2:
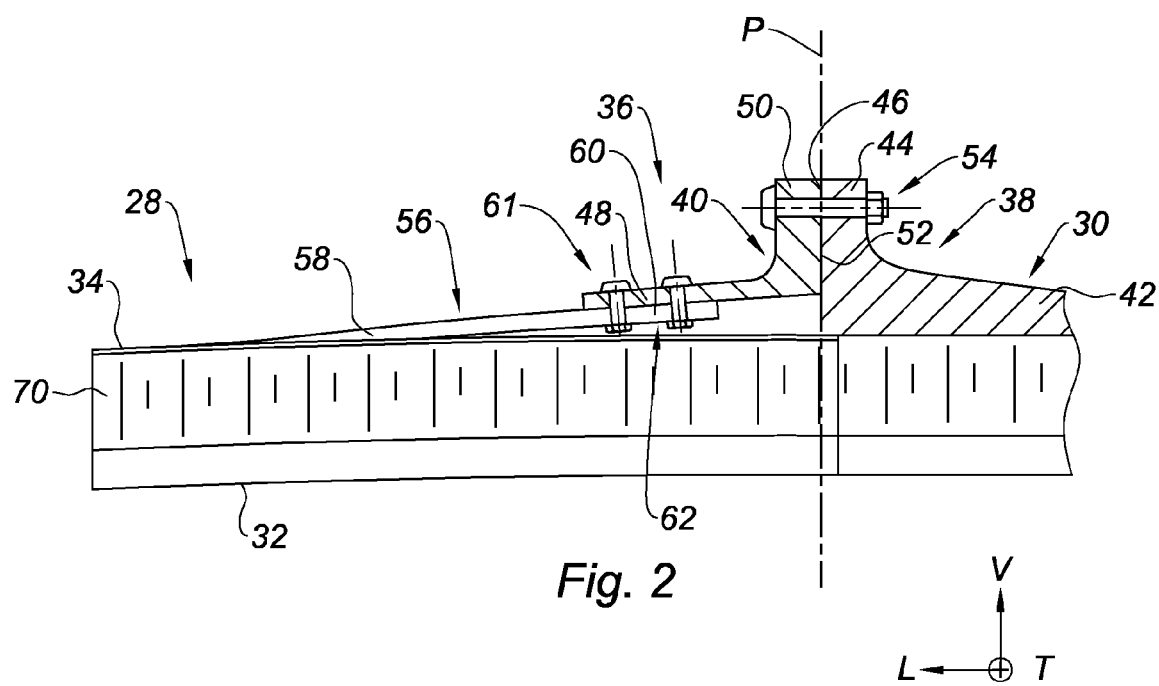
FIG. 2 is a schematic view in longitudinal section, which illustrates a device for fastening the air inlet shroud on a fan casing of the nacelle of FIG. 1, according to the present disclosure.

In addition, the expressions "upper," "lower," with reference to the upper portion and the lower portion respectively of FIG. 2, and the terms "inner" and "outer" with reference to the inside of the nacelle and to the outside of the nacelle respectively, will be used in a non-limiting way.

It should be also noted that in the present patent application, the terms "upstream" and "downstream" must be understood relative to the circulation of the air flow inside the propulsion unit formed by the nacelle and the turbojet engine, that is to say from the left to the right according to FIG. 1.

For the various forms, the same references may be used for identical elements or ensuring the same function, for the sake of simplification of the description.

FIG. 1 shows a turbojet engine 12 nacelle 10 which has a tubular structure and which extends along a longitudinal axis A from upstream to downstream along the flow direction of the air flow from the left to the right according to FIG. 1.

The nacelle 10 comprises an air inlet 14 arranged upstream of the turbojet engine 12, a median section 16 intended to surround a fan 18 of the turbojet engine 12, a downstream section 20 intended to surround the combustion chamber of the turbojet engine 12 and optionally integrating thrust reversal means (not shown), and an ejection nozzle 22.

The air inlet 14 comprises in particular an annular inlet lip 24 forming a leading edge, and a downstream tubular structure forming an acoustic shroud 28 on which the lip 24 is added in order to channel the air towards the blades of the fan 18.

The acoustic shroud 28 is extended longitudinally by a fan casing 30 in order to guide the air flow.

As it can be seen in FIG. 2, the shroud 28 has an annular shape with an axis A, which extends axially from upstream to downstream along the longitudinal axis A of the nacelle 10 and which is delimited radially by an inner skin 32 and an outer skin 34 which encloses an alveolar acoustic panel 70.

The inner skin 32 is acoustically permeable and is for example constituted by a perforated skin allowing the sound waves to cross it.

Conversely, the outer skin is sealed and acoustically impermeable.

Also, the acoustic panel 70 may be an alveolar material keeping the inner skin 32 and the outer skin 34 apart, the acoustic panel 70 forming a cavity designed to absorb and dampen the sound waves.

The nacelle 10 is equipped with a device 36 for fastening the air inlet 14 on the fan casing 30, more particularly for fastening the acoustic shroud 28 on the casing 30.

To this end, the fastening device 36 includes a first metal flange 38 which is fastened on an upstream end of the casing 30, and a second L-shaped metal flange 40 which is fastened on a downstream end of the shroud 28.

The first flange 38 has an annular-shaped base 42 which extends generally axially along the longitudinal axis A of the nacelle 10 and which is fastened on the casing 30 by a mechanical linking means (not shown) such as an assembly of screws and nuts for example, or by any other fastening means.

In addition, the first flange 38 has an annular collar 44 which protrudes radially outwards from the base 42 and which delimits a first radial flanging face 46 arranged opposite the second flange 40.

Similarly, the second flange 40 has an annular-shaped base 48 which extends generally axially along the longitudinal axis A of the nacelle 10 and an annular collar 50.

The collar 50 of the second flange 40 protrudes radially outwards from the associated base 48, the collar 50 delimiting a second radial flanging face 52 provided to cooperate with the first complementary flanging face 46 of the first flange 38.

For this purpose, the second flanging face 52 and the first flanging face 46 are joined along a radial flanging plane P, and each delimit a series of holes for the passage of fastening means, such as an assembly of screws and nuts 54 for example, or any other fastening means.

In another form, the second flange 40 is made of metal alloy, and in a variant thereof, the metal may be an aluminum or titanium alloy.

These alloys have high resistances and elongations before rupture which are particularly adapted for producing this type of flange which must withstand significant deformations imposed by the casing 30 in the extreme cases of rupture of a blade of the fan.

According to a different form, the second flange 40 may be made of composites among thermocompression technologies of discontinuous and continuous fibers, or of RTM (Resin Transfer Molding) of fibrous textures.

The fibers are in one form selected among carbon fibers, glass fibers and matrixes among the thermosetting epoxy polymers and the thermoplastics of the Polyaryletherketone (PAEK) family.

Also, in order to reduce the flatness issues to the right of the flanging plane P, the collar 50 of the second flange 40 and the collar 44 of the first flange 38 can be machined.

Figure 3:
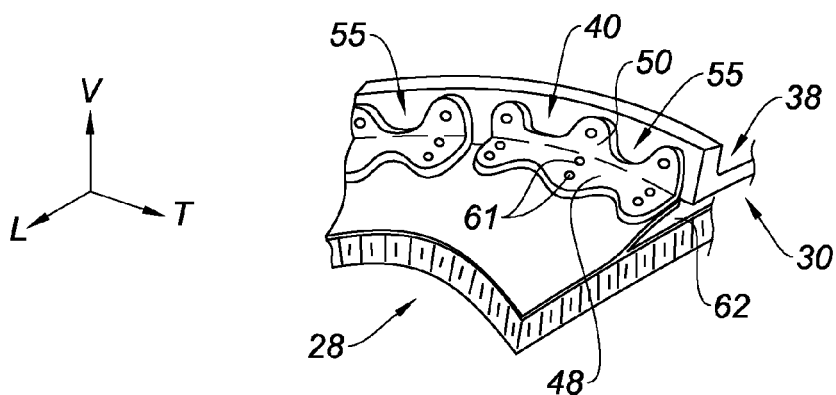
FIG. 3 is a detail view with a perspective cutaway, which illustrates the first flange and the second flange of the device of FIG. 2.

As illustrated in FIG. 3, the second flange 40 in one form is made of a plurality of sector-shaped portions 55, which are independent and identical and which are arranged in an annular shape around the axis of the shroud 28.

According to the example shown in FIG. 3, each portion 55 delimits three holes which are evenly distributed about the axis A and which are provided for the passage of the fastening means on the first flange 38.

Figure 4:
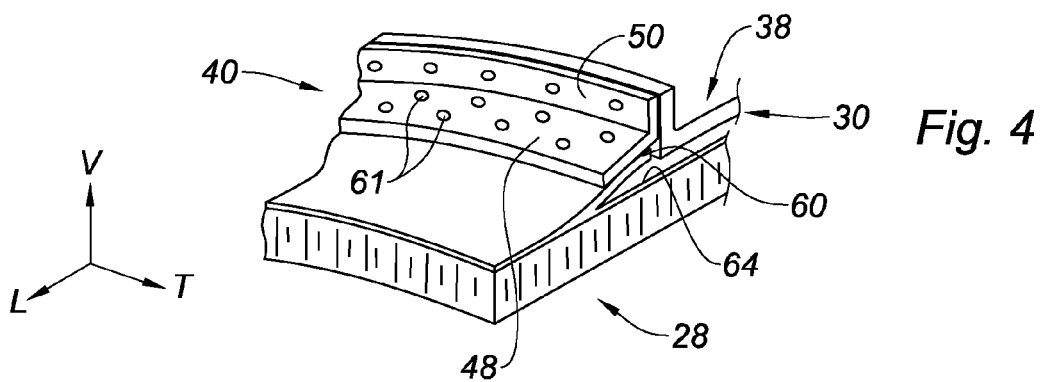
FIG. 4 is a detail view with perspective cutaway, which illustrates the first flange and the second flange of the device of FIG. 2 according to a variant.

According to yet another form shown in FIG. 4, the second flange 40 is made in ring-shaped one piece.

In addition, but not limited to, the second flange 40 may be made of a plurality of portions which are mechanically linked to each other by add-on linking means.

According to another aspect of the present disclosure, the device 36 includes a protrusion forming an annular ring 56 which extends about the axis A of the nacelle 10 and which extends longitudinally from an upstream segment 58 secured to the outer skin 34 of the shroud 28, to a downstream segment 60 which is adapted to be fastened on the base 48 of the second L-shaped flange 40 by fastening means 61.

It will be noted that the ring 56 may be independent of the second flange 40.

The downstream segment 60 of the ring 56 may have a truncated cone flared shape with a radial section increasing along an axial direction from upstream to downstream, this flared shape allowing the downstream segment 60 to delimit a radial space 62, or cavity, with the outer skin 34 of the shroud 28.

In addition, the ring 56 may be made of a composite material.

According to one variation, the ring 56 is made in a succession of fabric skins which are pre-impregnated with a binder, such as resin.

According to another variation, the ring 56 is made at the same time as the outer skin 34 of the shroud 28 by a stack of fabric and/or fiber layers which may partially be part of the constitution of the outer skin 34.

The fabric and/or fiber layers are impregnated with resin and reinforced by polymerization.

Also, the skins of the ring 56 may be carried out by a method of placing binder pre-impregnated fibers or of draping binder pre-impregnated plies.

The ring 56 may also be carried out by injection molding, for example by an injection method of resin into a fibrous preform arranged in a mold, such as by way of example RTM.

Subsequent to its manufacture, the ring 56 may be bonded or cofired with the fiber layers of the outer skin 34 of the shroud 28.

Without limitation, the ring may be made by any other type of method for manufacturing a composite material part.

To constitute the radial space 62 formed between the downstream segment 60 of the ring 56 and the outer skin 34 of the shroud 28, an extractable tooling element (not shown) may be inserted for the draping and the polymerization of the assembly.

The downstream segment 60 of the ring 56, which is radially shifted from the acoustic shroud 28, has the advantage of not degrading the geometric shape of the acoustic assembly formed by the outer skin 34, the inner skin 32 and the acoustic panel 70 of the shroud 28 which extends therefore axially downstream continuously beyond the ring 56 and may extend until the flanging plane P, and even possibly beyond the inside of the fan casing 30.

According to a variant of the present disclosure, the device 36 comprises a triangular-sectional corner 64, shown in FIG. 4, which is interposed radially between the outer skin 34 of the shroud 28 and the downstream segment 60 of the ring 56.

The corner 64 may be made for example of composite material and allows in particular avoiding or limiting the deformation of the downstream segment 60 of the ring 56, the corner 64 which can have the shape of a closed or open ring or formed by several angular sectors.

With reference to FIG. 2, the means 61 for fastening the downstream segment 60 of the ring 56 on the base 48 of the second flange 40 may include a plurality of metal links, such as an assembly of screws and nuts and/or an assembly of rivets, for example.

Figure 5:
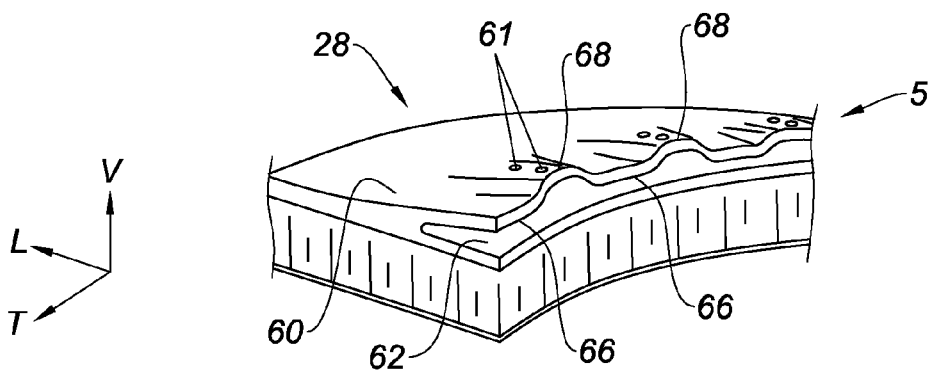
FIG. 5 is a detail view with a perspective cutaway, which illustrates the ring for linking the second flange on the shroud of the device of FIG. 2.

These fastening means are not shown in FIGS. 3 to 5.

The base 48 of the second flange 40 delimits a series of holes 65 for the passage of the fastening means 61.

In order to provide a more reliable fastening of the ring 56 on the second flange 40, the holes 65 are distributed in two rows, staggered as illustrated in FIG. 4 or opposite as illustrated in FIG. 3.

Furthermore, the downstream segment 60 of the ring 56 may be machined if in order to promote the cooperation between the downstream segment 60 of the ring 56 and the base 48 of the associated second flange 40.

Figure 6:
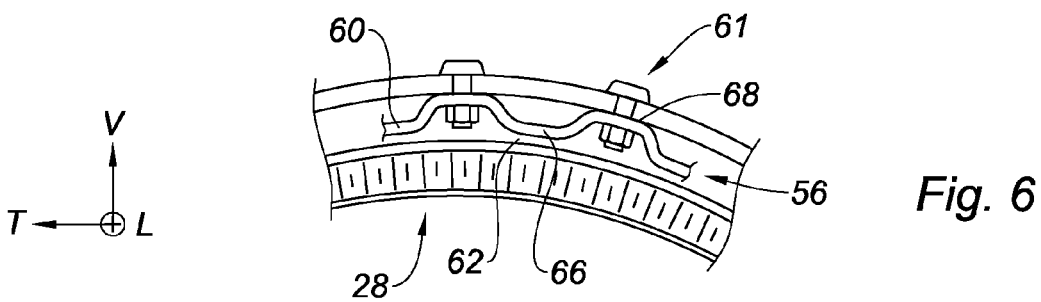
FIG. 6 is a detail view in cross section, which illustrates the ring for linking the second flange on the shroud of the device of FIG. 2.

Referring to FIGS. 5 and 6, the downstream segment 60 of the ring 56 has a wave shape which draws an alternation of hollows 66 and bumps 68 distributed about the axis A of the shroud 28.

The bumps 68 each forms a radial overthickness designed to promote the fastening of the ring 56 on the second flange 40 by the fastening means 61, as it can be seen in FIG. 6.

Finally, with reference to FIG. 1, the acoustic panel 70 extends longitudinally beyond the plane P of the second L-shaped flange 40.

Without limitation, the acoustic panel 70 can extend only until the flanging plane P, the casing 30 including therefore an additional acoustic panel arranged in the extension.

Advantageously, the fastening device 36 according to the present disclosure is lightweight, of simple, robust and reliable design, and it allows linking the shroud 28 on the casing 30 without perforating the acoustic panel 70, thus preserving its noise absorbing capacities.

The present disclosure also concerns a method for manufacturing the device 36 described above.

According to this method, the protrusion 56 is made integral with the outer skin 34 of the shroud 28.

The expression "made integral with" means that the protrusion 56 is carried out simultaneously with the outer skin 34 of the shroud 28, as described above.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A device for fastening a downstream end of an air inlet on a fan casing of an aircraft turbojet engine nacelle wherein the downstream end comprises an acoustic shroud having an annular shape, the acoustic shroud extending axially from an upstream point to a downstream point along a longitudinal axis and delimited radially by an inner skin and an outer skin enclosing an acoustic panel, the device comprising:
    a first flange coupled to the fan casing;
    a second L-shaped flange having a base coupled to the acoustic shroud and a collar linked to the first flange; and
    a protrusion, wherein the protrusion extends longitudinally from an upstream segment to a downstream segment, wherein the upstream segment is fixed to the acoustic shroud and the downstream segment delimits a radial space with the acoustic shroud, and
    wherein the protrusion is adapted to be fastened on the base of the second L-shaped flange by fastening means.

2. The device according to claim 1, wherein the protrusion is in a shape of an annular ring.

3. The device according to claim 1, wherein the acoustic panel of the acoustic shroud extends continuously from the upstream segment to the downstream segment of the protrusion.

4. The device according to claim 1, wherein the second L-shaped flange comprises a metallic material.

5. The device according to claim 1, wherein the second L-shaped flange includes a plurality of independent portions arranged annularly along the longitudinal axis of the acoustic shroud.

6. The device according to claim 1, wherein the protrusion comprises a composite material.

7. The device according to claim 1, wherein the protrusion comprises a wave shape that draws an alternation of hollows and bumps distributed about the longitudinal axis of the acoustic shroud, said bumps each forming a radial overthickness designed to promote fastening of the second L-shaped flange on the protrusion.

8. The device according to claim 1, wherein the acoustic panel extends longitudinally downstream beyond the plane of the second L-shaped flange.

9. The device according to claim 1, wherein the device further comprises a corner disposed radially between the outer skin and the downstream segment of the protrusion.

10. The device according to claim 1, wherein the fastening means includes a plurality of metal links configured to connect the downstream segment of the protrusion to the base of the second L-shaped flange.

11. The device according to claim 1, wherein the protrusion is integral with the outer skin of the acoustic shroud.

* * * * *